United States Patent
Flora (10) Patent No.: US 10,244,783 B2
(45) Date of Patent: Apr. 2, 2019

(54) FRUIT PIERCER WITH EXTERNAL DRIVE MECHANISM

(71) Applicant: David A. Flora, Kalamazoo, MI (US)

(72) Inventor: David A. Flora, Kalamazoo, MI (US)

(73) Assignee: Dunkley International, Inc., Kalamazoo, MI (US)

( * ) Notice: Subject to any disclaimer, the term of this patent is extended or adjusted under 35 U.S.C. 154(b) by 0 days.

(21) Appl. No.: 14/962,869

(22) Filed: Dec. 8, 2015

(65) Prior Publication Data
US 2016/0157514 A1    Jun. 9, 2016

Related U.S. Application Data (60) Provisional application No. 62/089,298, filed on Dec. 9, 2014.

(51) Int. Cl.
*A23N 4/06* (2006.01)
*A23N 15/02* (2006.01)

(52) U.S. Cl.
CPC ............ *A23N 4/06* (2013.01); *A23N 15/02* (2013.01)

(58) Field of Classification Search
CPC . A23N 15/02; A23N 4/02; A23N 4/04; A23N 4/06; A23N 4/08; A23N 4/085; A23N 4/10
USPC .......... 99/544, 547, 549, 552, 555–559, 565
See application file for complete search history.

(56) References Cited

U.S. PATENT DOCUMENTS

| | | | | |
|---|---|---|---|---|
| 121,592 A | * | 12/1871 | Comstock | A23N 4/06 99/547 |
| 292,393 A | * | 1/1884 | Williams | A23N 4/06 99/561 |
| 974,759 A | * | 11/1910 | Dunkley | A23N 4/06 99/561 |
| 1,256,885 A | * | 2/1918 | Dunkley | A23N 4/06 99/547 |
| 1,336,852 A | * | 4/1920 | Morse | A23N 4/06 99/547 |
| 1,458,163 A | * | 6/1923 | Whitman | A23N 4/06 99/549 |
| 1,694,263 A | * | 12/1928 | Howson | A23N 4/06 99/547 |
| 1,726,719 A | * | 9/1929 | Schau | A23N 4/06 99/547 |
| 1,843,283 A | * | 2/1932 | Howson | A23N 4/06 99/547 |
| 2,205,397 A | * | 6/1940 | Drake | A23N 4/02 99/490 |
| 2,499,266 A | * | 2/1950 | Carroll | A23N 4/06 198/481.1 |
| 2,552,971 A | * | 5/1951 | Hoover | A23N 4/06 99/561 |
| 2,635,662 A | * | 4/1953 | Doering | A23N 4/06 198/396 |
| 2,935,104 A | * | 5/1960 | Ashlock | A23N 4/06 267/153 |

(Continued)

*Primary Examiner* — Dana Ross
*Assistant Examiner* — Joe E Mills, Jr.
(74) *Attorney, Agent, or Firm* — Foster, Swift, Collins & Smith, P.C.; Zachary W. Behler (57) ABSTRACT

The present invention is a fruit piercing assembly in which the drive assembly is located on the outside of the frame assembly to eliminate lubricants from the drive assembly contaminating the fruit as it was being pierced.

6 Claims, 14 Drawing Sheets

(56) References Cited

U.S. PATENT DOCUMENTS

| | | | | |
|---|---|---|---|---|
| 3,454,064 A | * | 7/1969 | Gettys | A23N 4/06 99/561 |
| 3,618,648 A | * | 11/1971 | Becq | A23N 4/04 99/549 |
| 3,817,168 A | * | 6/1974 | Maytum | A23N 4/06 99/490 |
| 3,915,082 A | * | 10/1975 | Rejsa | A23N 4/06 99/548 |
| 3,965,809 A | * | 6/1976 | Kieldsen | A23N 4/06 99/492 |
| 4,009,650 A | * | 3/1977 | Lascelles | A23N 4/06 209/559 |
| 4,050,371 A | * | 9/1977 | Sato | A23N 4/04 99/550 |
| 4,539,900 A | * | 9/1985 | Reed | A47J 37/044 99/353 |
| 5,543,166 A | * | 8/1996 | Masel | A47J 37/047 426/438 |
| 2011/0232508 A1 | * | 9/2011 | Nicholas | A23N 4/02 99/547 |
| 2014/0251110 A1 | * | 9/2014 | Miller | A23N 15/02 83/866 |

* cited by examiner

FRUIT PIERCER WITH EXTERNAL DRIVE MECHANISM

CROSS REFERENCE TO RELATED APPLICATION

This application claims priority to U.S. Provisional Application Ser. No. 62/089,298 "Fruit Piercer With External Drive Mechanism," filed Dec. 9, 2014.

FIELD OF INVENTION

The present invention relates to processing equipment for use with fruit and particularly to a means for piercing such fruit for pitting purposes or in preparation for infusion.

BACKGROUND

In the food processing industry it has been found that there is a need to pierce many fruits after they have been harvested. Sometimes the fruit may be pierced to remove the pit. This is especially true in the processing of cherries. However, non-pitted fruits such as cranberries may also require piercing prior to being treated with sweeteners. Cranberries are the fruits of the cranberry bush, which is a plant belonging to the heath family and is grown in bogs in the Northern Hemisphere. They are in the form of a ball having a diameter of 15 to 20 mm. As cranberries are strongly acidic, fresh cranberries are not suitable for eating; they are squeezed to provide cranberry juice, cooked with sugar to provide a preserve, or sweetened then dried to provide dried cranberries, which are eaten as dried fruit. Tart fruits, such as cranberries, can be made more palatable by infusing the fruit with a sweet solution prior to consumption.

In the past, fruit piercers were constructed so that at least some portion of the drive assembly was located inside of the frame assembly. This created a situation where lubricants from the drive assembly could contaminate the fruit as it was being pierced. Placing the drive assembly outside of the frame assembly also facilitates easier servicing. Thus a need exists for a fruit piercer with an external drive assembly.

SUMMARY

The present invention is a fruit piercing assembly in which the drive assembly is located on the outside of the frame assembly to eliminate lubricants from the drive assembly contaminating the fruit as it was being pierced.

DESCRIPTION

The following description is presented to enable any person skilled in the art to make and/or use the invention. For purposes of explanation, specific nomenclature is set forth to provide a thorough understanding of the present invention. Descriptions of specific embodiments or applications are provided only as examples. Various modifications to the embodiments will be readily apparent to those skilled in the art, and general principles defined herein may be applied to other embodiments and applications without departing from the spirit and scope of the invention. Thus, the present invention is not intended to be limited to the embodiments shown, but is to be accorded the widest possible scope consistent with the principles and features disclosed herein.

Figure 1:
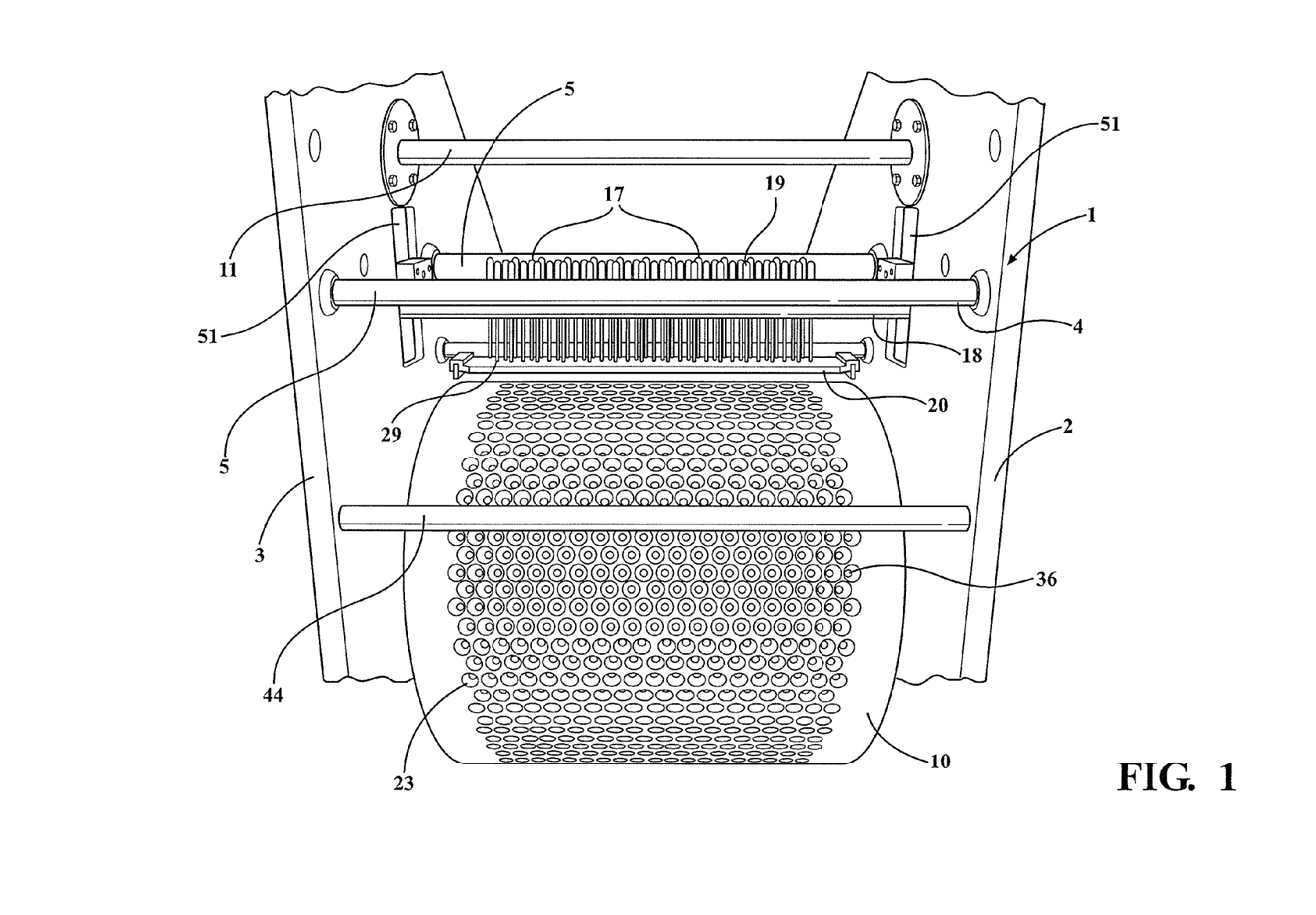
FIG. 1 is a close up view of the back of fruit piercer.
Figure 7:
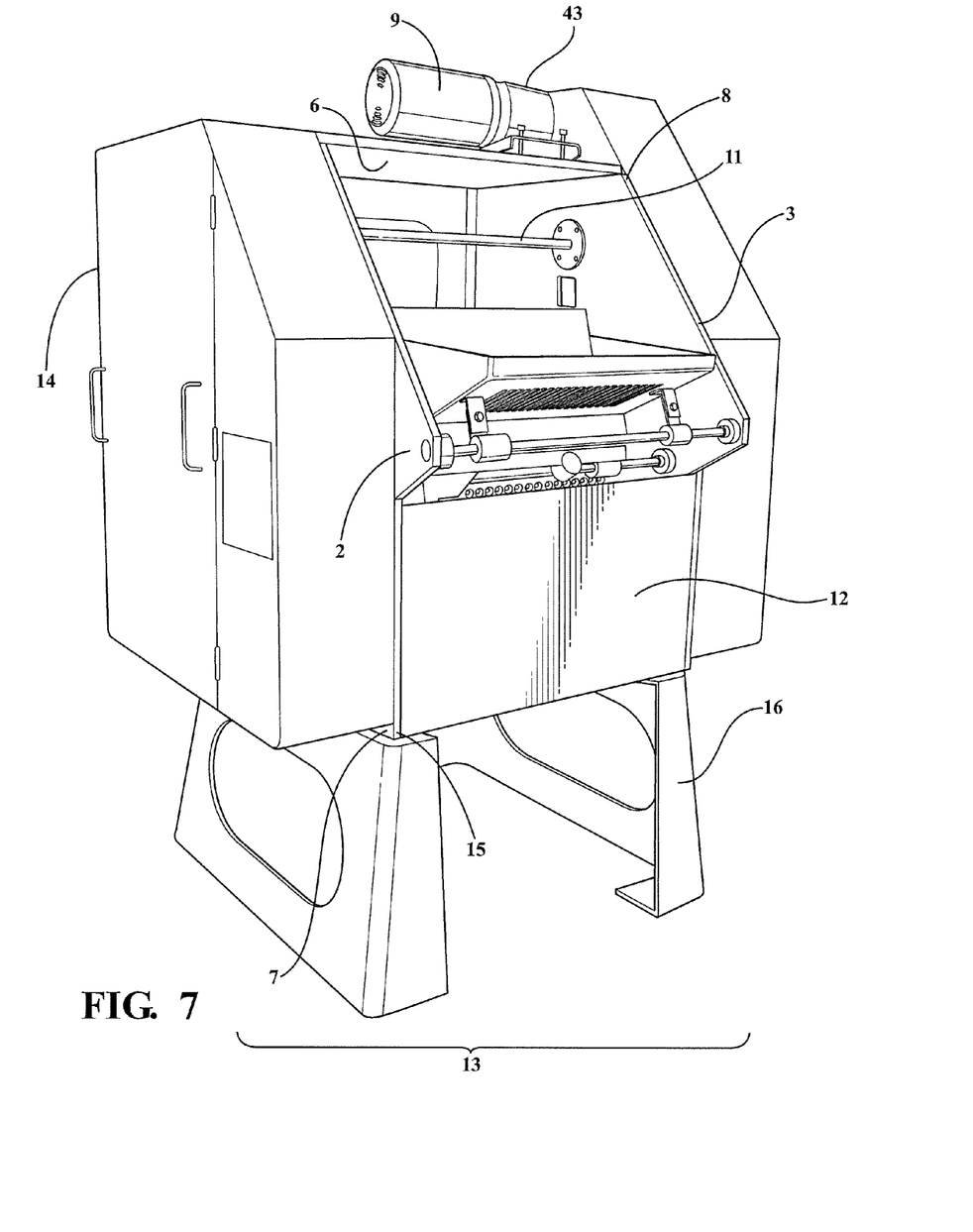
FIG. 7 is front perspective view of the fruit piercer.

FIG. 1 is a close up view of the back 14 of fruit piercer 13. As shown in FIG. 1, the frame assembly 1 comprises a left side 2, a right side 3, and a means for maintaining the left side and the right side in parallel orientation 4. In the preferred embodiment, the means for maintaining the left and right side in parallel orientation 4 comprises two support rods 5, a top 6, and a lower support bracket 7. FIG. 7 is front perspective view of the fruit piercer. FIG. 7 depicts the top 6 which is typically affixed to the upper edge 8 of both the left side 2 and right side 3 and may be configured to support the motor 9. The support rods 5 are typically placed above the drum 10 and below the eccentric shaft 11. One support rod 5 is typically placed in the front 12 of the piercer 13 and one near the back 14 although other configurations are possible. FIG. 7 also depicts the lower support bracket 7 that is preferably a weldment or plurality of weldments that attach to the lower edge 15 of the left side 2 and right side 3. The lower support bracket 7 can be attached to the left side 2 and right side 3 by any means suitable for insuring the structural integrity of the frame assembly. In the preferred embodiment the lower support bracket 7 is attached to the left side 2 and right side 3 using bolts. The lower support bracket 7 can optionally be configured to attach the piercer 13 to a stand 16 or counter.

Figure 3:
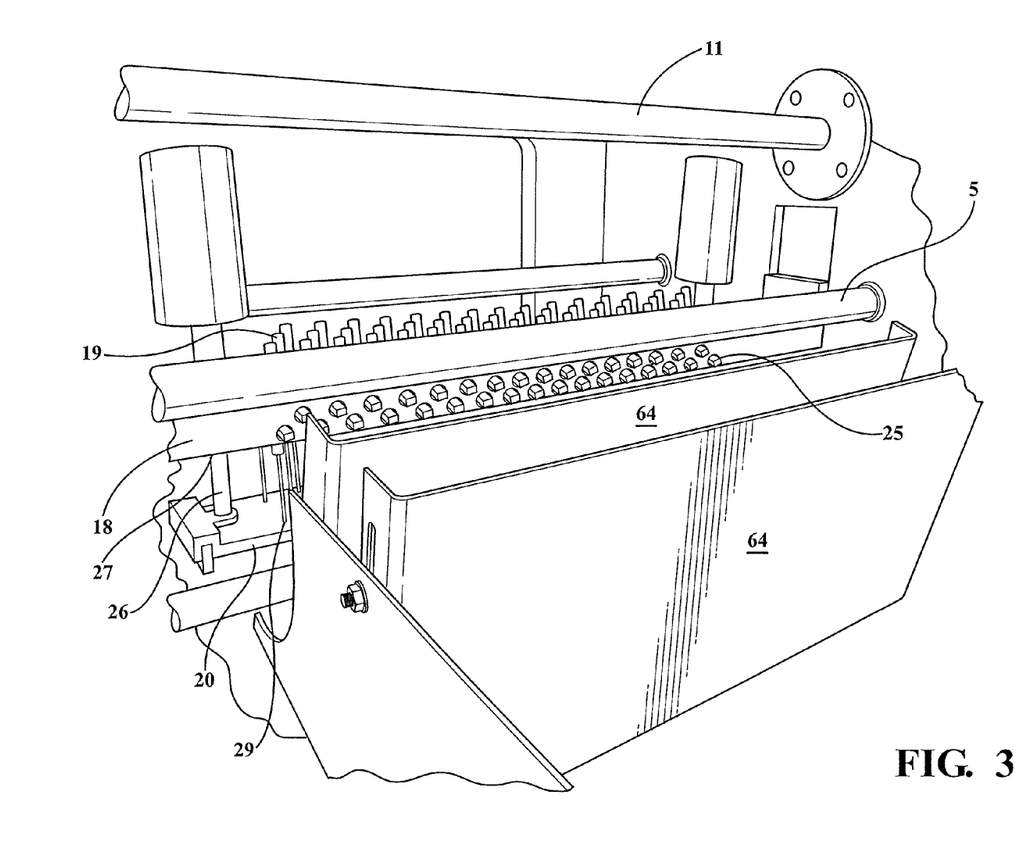
FIG. 3 is a close up view of needle assembly and hopper assembly.
Figure 4:
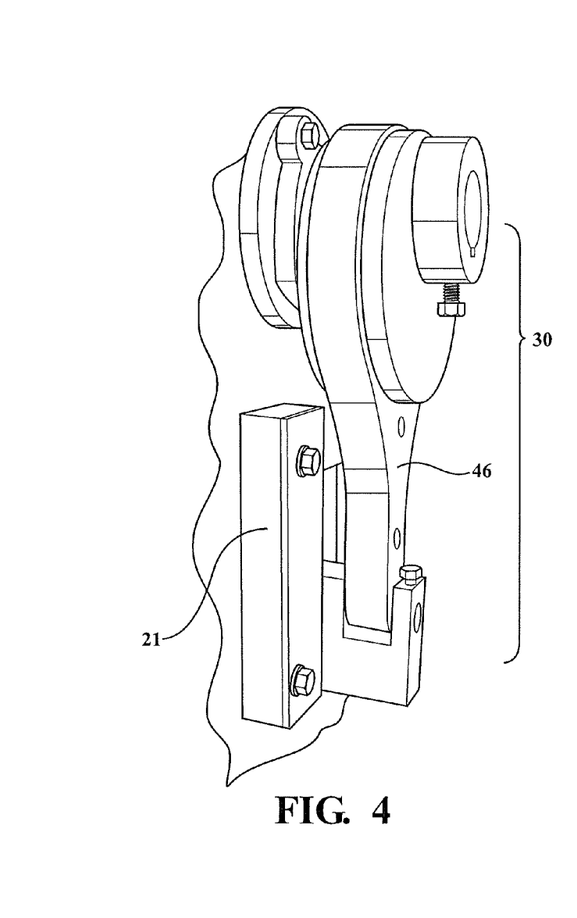
FIG. 4 is a side view of the eccentric assembly.
Figure 10:
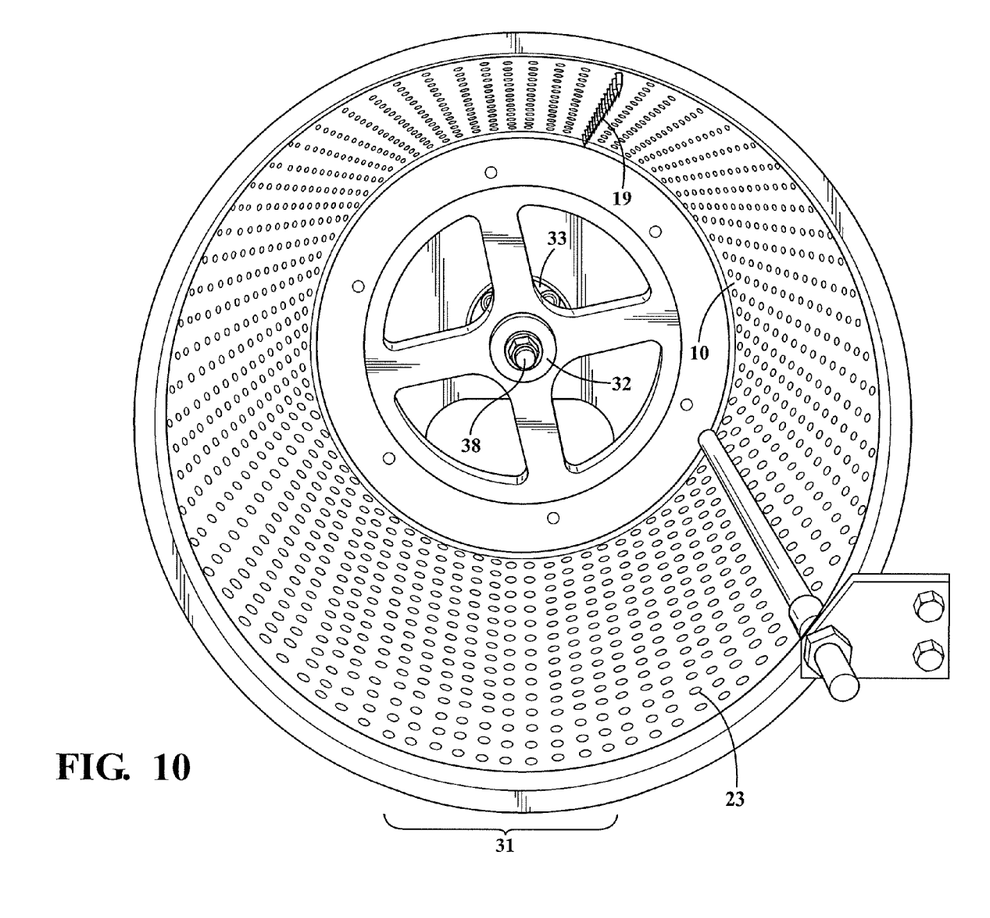
FIG. 10 is a side view of the inside of the drum.
Figure 12:
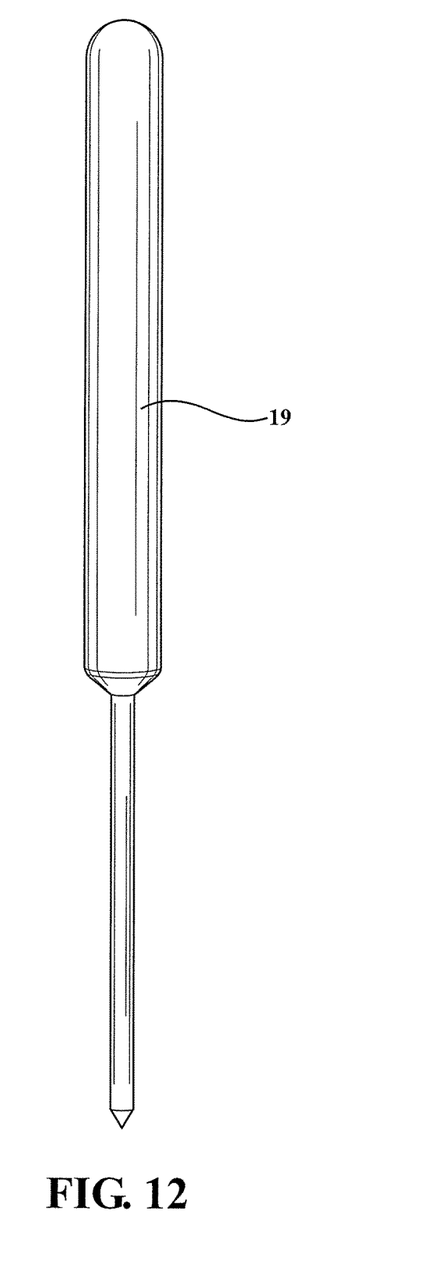
FIG. 12 is a front view of a needle.
Figure 14:
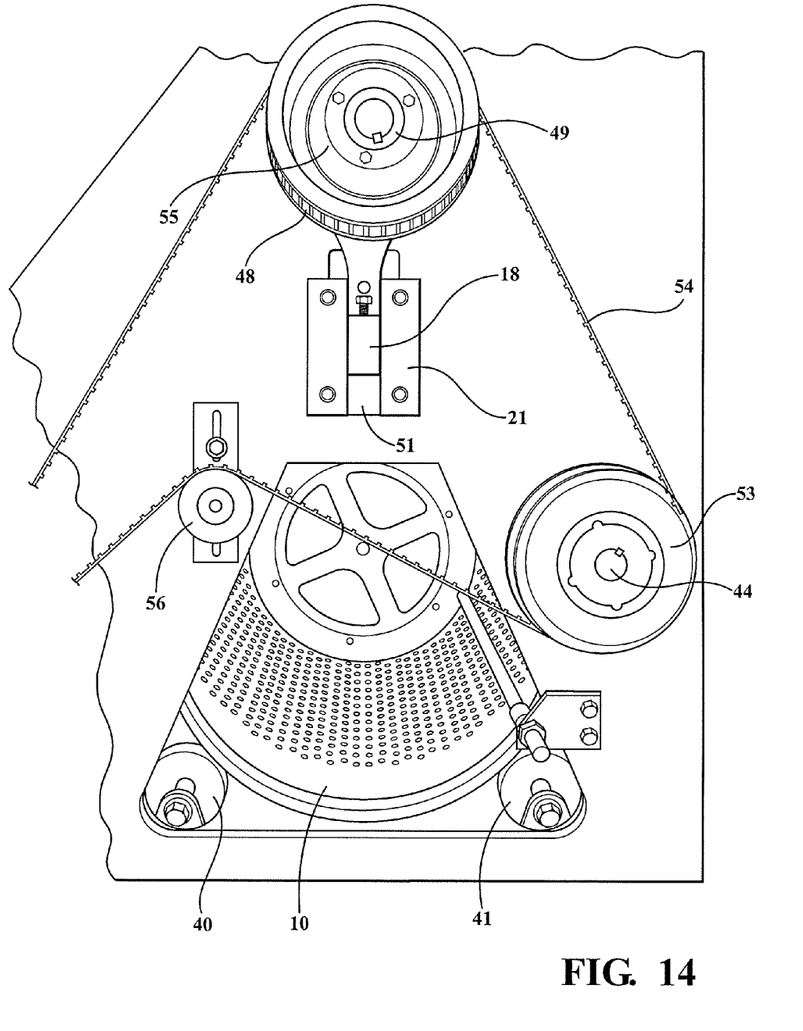
FIG. 14 is a side view of the fruit piercer depicting the gib.

FIG. 3 is a close up view of needle assembly 17 and hopper assembly 57. As shown in FIG. 3, the needle assembly 17 comprises a needle bar 18, a plurality of needles 19, and a stripper bar 20. FIG. 12 is a front view of a needle 19. The needle bar 18 is configured to extend across the frame assembly 1 and into the gib 21 of the drive assembly 22. FIG. 14 is a side view of the fruit piercer depicting the connection of the needle bar 18 connection to the gib 21. The needle bar 18 is further configured to hold a plurality of needles 19 oriented so that they may pierce into the pockets 23 in the drum 10. FIG. 10 is a side view of the inside of the drum 10 that depict the needles 19 piercing into the pockets 23 in the drum 10. In the preferred embodiment, the needles 19 are inserted into holes 24 in the needle bar 18 and adjustably held in place by set screws 25 (FIG. 3). This configuration has the added advantage of making the replacement of a single needle 19 possible should one become damaged during use. In the piercing only configuration the needle 19 preferably consists of a ⅜ inch round shank narrowing down to ⅛ inch. In configurations used for pitting, the needle 19 is formed with a cup on the end to catch the pit as the needle 19 passes through the fruit. Preferably, pitting needles 19 are fluted to minimize damage to the fruit during pitting. FIG. 3 is a close up view of needle assembly and hopper assembly. As shown in FIG. 3, guide posts 26 to affix the stripper bar 20 may also be inserted into a hole 27 in the needle bar 18. Two nuts 28 (not shown) are then affixed to the top of the guidepost 26 to set the lower bound of the stripper bar 20. When in use the guide posts 26 are allowed to slide through the guide post hole 27 when the needles 19 are depressed. When the needles 19 are retracted, gravity pulls the guide posts 26 down the needles 19 until the nut 28 is stopped by the top of the needle bar 18. The guide posts 26 facilitate the connection of the needle bar 18 to the stripper bar 20. The stripper bar 20 is configured with a plurality of holes 29 configured to accept the needles 19 as they are depressed by the eccentric assembly 30. When the piercer 13 is in use, the stripper bar 20 removes any fruit that has stuck to the needles 19 after piercing.

Figure 9:
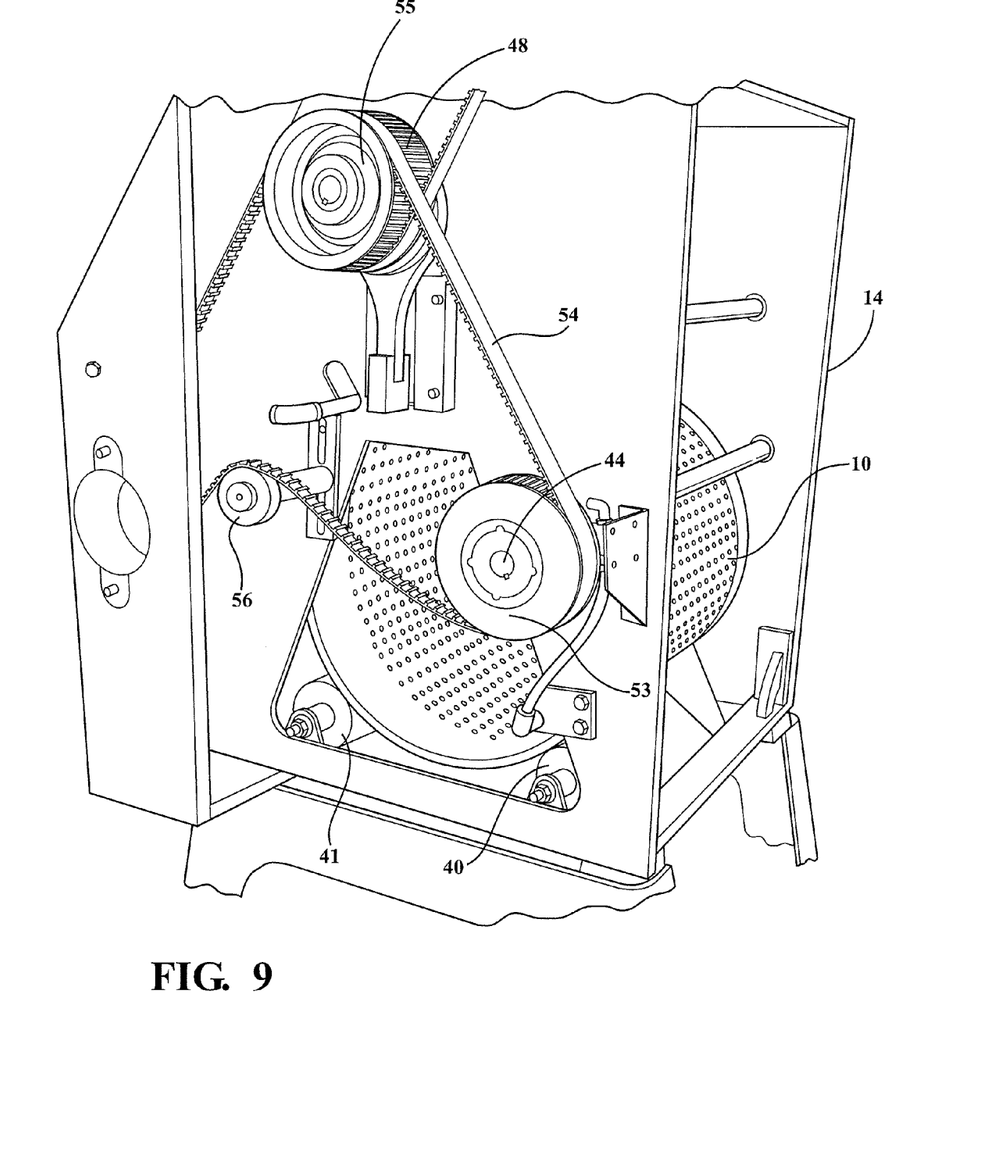
FIG. 9 is a left side view of the fruit piercer.

FIG. 9 is left side view of the fruit piercer. As shown in FIG. 1, FIG. 9, and FIG. 10, the drum assembly 31 preferably comprises a cylindrical drum 10 configured with a plurality of pockets 23, a support bearing 32, a hub 33, a drive shaft 34, and two trunnion wheels 40 and 41. The pockets 23 in the drum 10 are preferably formed into a half sphere which is slightly larger than the fruit to be pierced. There are several acceptable ways to form the pockets 23. The drum 10 may be stamped with pockets 23 or pockets 23 may be formed by inserts fitted into holes in the drum. Inserts may be constructed of any material suitable for making the pockets 23, such a metal, plastic, or rubber. As an option, pockets 23 may include a tapered profile with a radiused bottom, which may be a removable elastometric part. At the lower limit of the pocket 23 a hole 36 is positioned so that a needle 19 from the needle assembly 18 may pass through the pocket 23 to the interior of the drum 10. In the preferred embodiment, two support bearings 32 are utilized. One bearing 32 is placed on the inside of the right side 3 of the frame assembly 1. Between the two support bearings 32 a hole 37 (not shown) is placed in the right side 3 of the frame assembly 1 to allow the drive shaft 34 to pass through the bearings 32. The left end of the drive shaft 38 (FIG. 10) is connected to a hub 33 which facilitates the connection between the drive shaft 34 and the drum 10. The right end of the drive shaft 38 is attached to the Geneva wheel 45 in the drive assembly 22. In the preferred embodiment, two trunnion wheels 40, 41 are used to stabilize the left side of the drum 10. The first trunnion wheel 40 is placed in the front left corner of the frame assembly 1 and the second trunnion wheel 41 is place in the back left corner of the frame assembly 1. The trunnion wheels 40, 41 engage the lower left portion of the drum 10 to stabilize the portion of the drum 10 furthest from the support bearings 32 while still allowing the drive shaft 34 to spin the drum 10.

Figure 13:
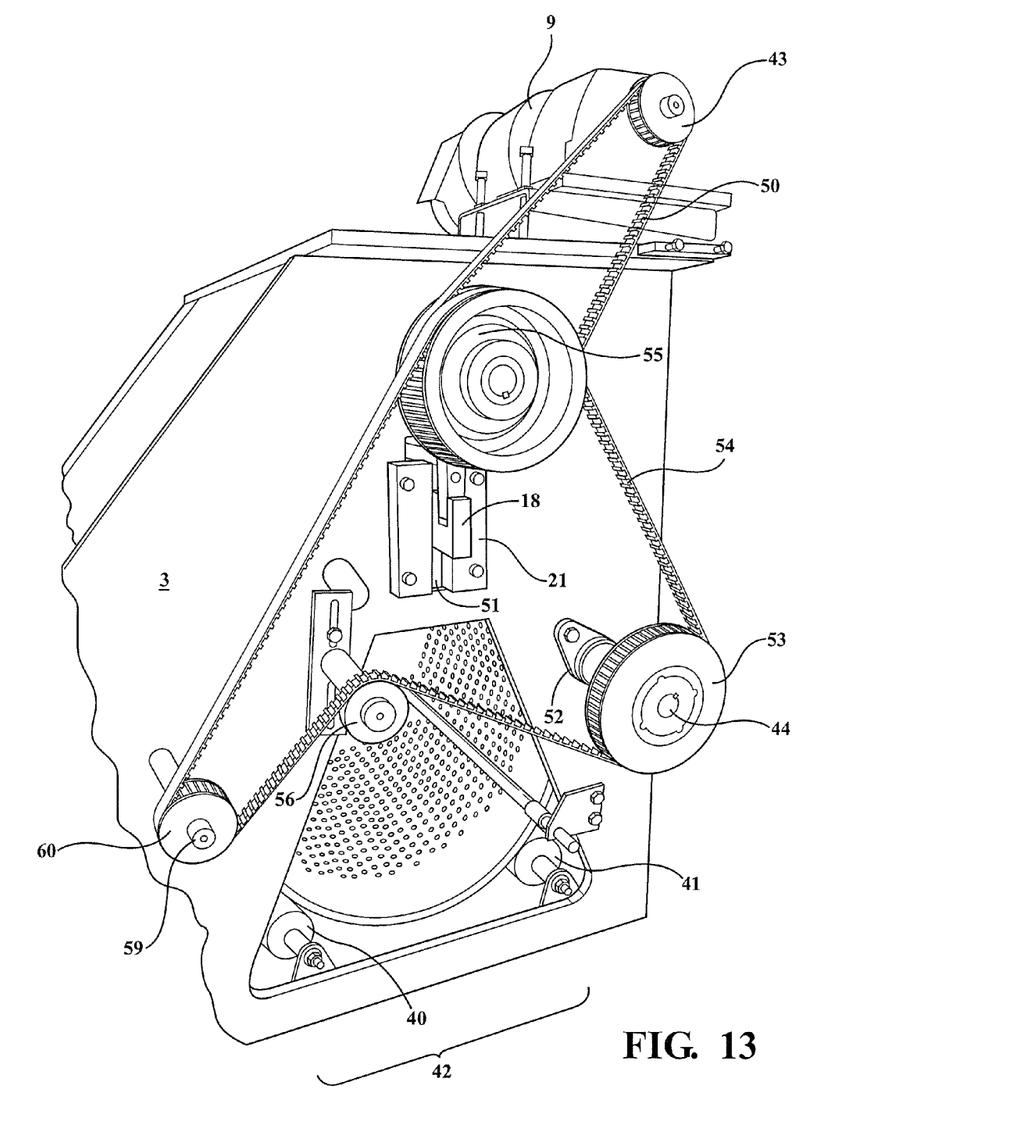
FIG. 13 is a side view of the fruit piercer depicting the drive assembly.
Figure 15:
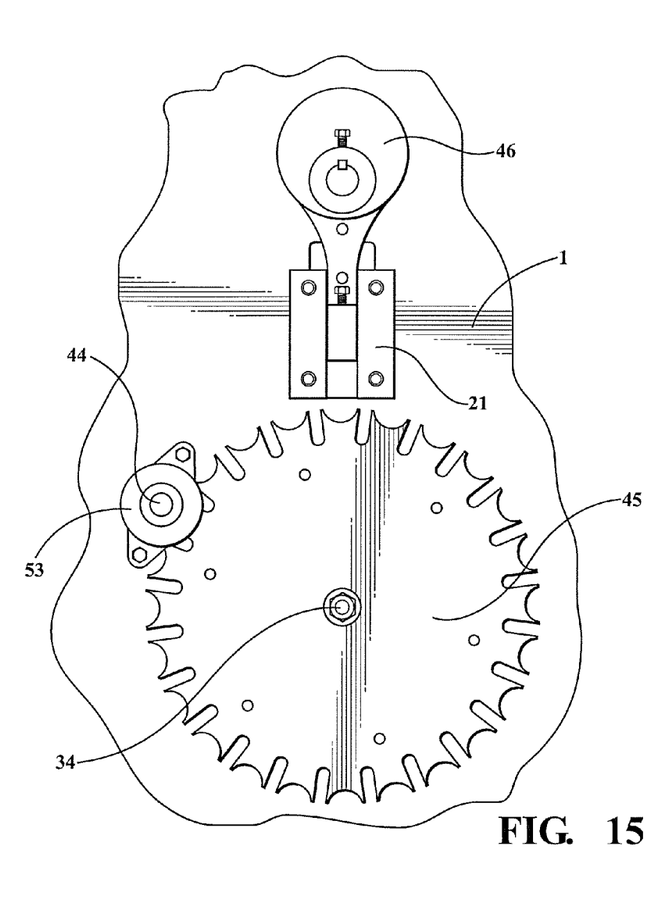
FIG. 15 is a side view of the fruit piercer depicting the eccentric assembly and Geneva wheel.

FIG. 13 is a left side view of the fruit piercer 13 depicting the drive assembly 42. FIG. 15 is a right side view of the fruit piercer depicting the eccentric assembly 30 and Geneva wheel 45. As shown in FIG. 13 and FIG. 15, the drive assembly 42 comprises a source of rotary power 43, an eccentric assembly 30 a cam shaft 44, a gib 21, and a Geneva wheel 45. In the preferred embodiment, the source of rotary power 43 is an electric motor 9, but a different motor, or other source of rotary power 43, such as windmill, or crank could also be utilized. The motor 9 is preferably mounted on the top 6 of the frame assembly 1 (FIG. 7), but could be placed in other locations that facilitate the connection of the motor 9 to the other components of the drive assembly 42.

Figure 2:
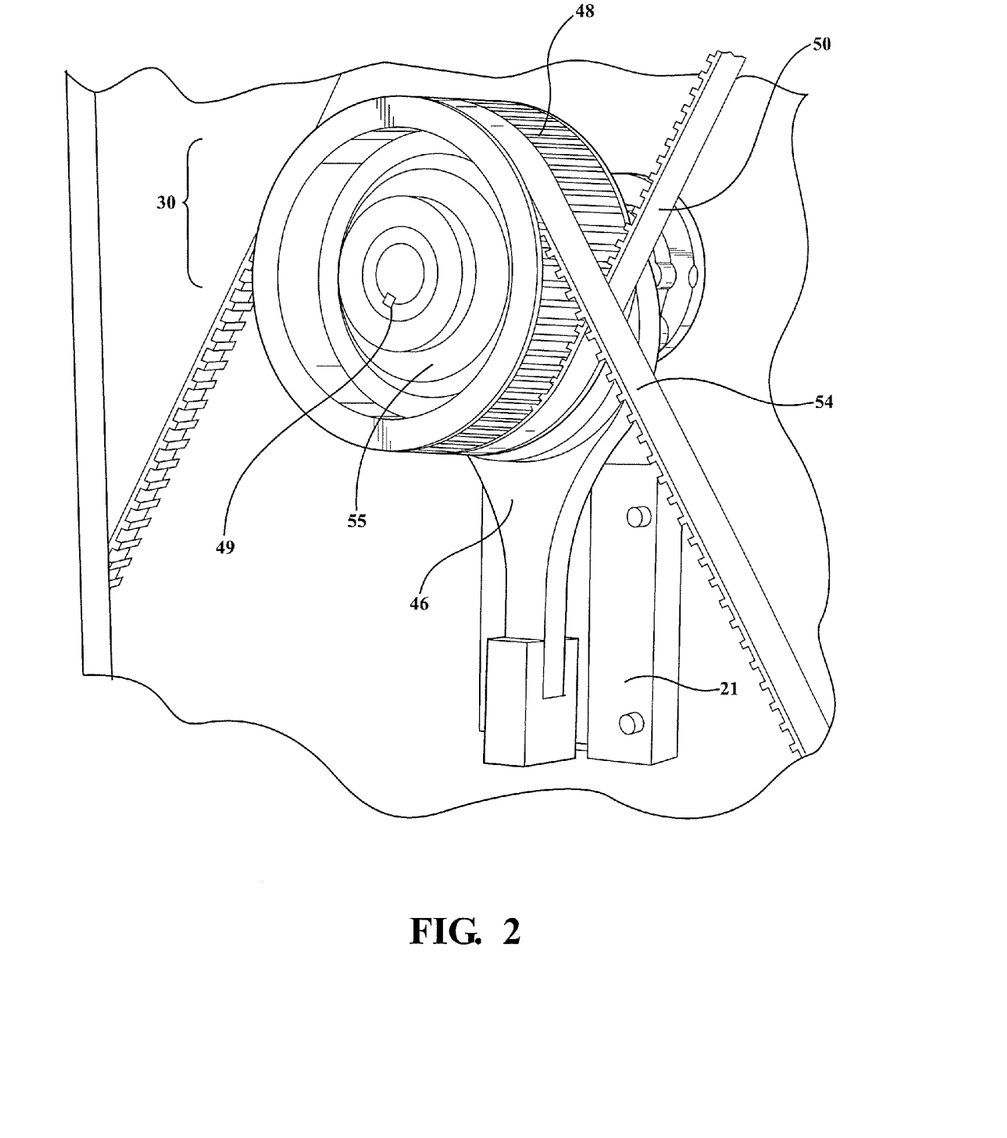
FIG. 2 is a close up view of the left side eccentric assembly.
Figure 8:
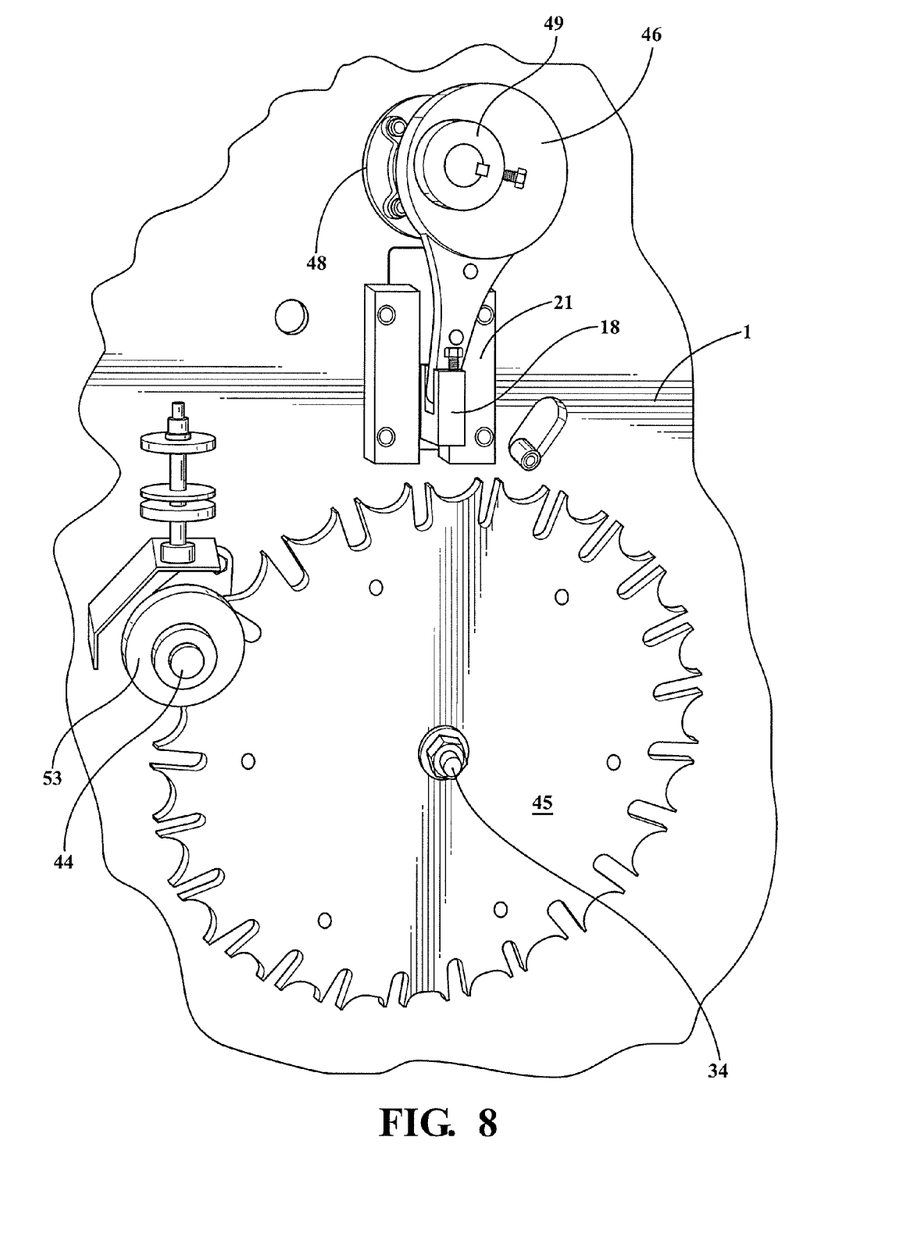
FIG. 8 is a right side view of the fruit piercer showing the connection of the drive shaft to the Geneva wheel.

The eccentric assembly 30 comprises an eccentric shaft 11, two eccentrics 46 one on the left side 2 and one on the right side 3 of the frame 1, and a driven sprocket 48 or pulley. An eccentric 46 is a component that converts rotary motion into oscillating vertical motion and are known in the art. The eccentric shaft 11 is preferably placed in the upper portion of the frame assembly 1. This is facilitated by a hole in the left side 2 and right side 3 of the frame assembly 1. The eccentric shaft 11 is attached to the two eccentrics 46 on the outside of the frame assembly 1. The driven sprocket/pulley 48 is attached to right end of the eccentric shaft 11 and facilitates the connection of the motor 9 to the eccentric shaft 11. Optionally, the driven sprocket/pulley 48 may include a clutch 49 to stop the piercer 13 if it malfunctions. In the preferred embodiment, the motor 9 is attached to the driven sprocket/pulley 48 using a belt 50. However, other known connection methods such as chains could be used. FIG. 2 is a close up view of the left side 3 of the fruit piercer 13 depicting left portion of the eccentric assembly 30 and the gib 21. As shown in FIG. 2, below the eccentric shaft 11 is a slot 51 and gib 21 attached to the left 2 and right 3 side of the frame assembly 1. The gib 21 guides the needle bar 18 vertically as the eccentric 46 converts the rotary motion of the eccentric shaft 11 into vertical oscillating motion. The gib 21 can be constructed of any material suitable for this purpose. However, in the preferred embodiment, the gib 21 is constructed of brass, plastic and stainless steel. As show on FIG. 8, below the right gib 21 is the Geneva wheel 45. The Geneva wheels 45 are known in the art and generally are a component that converts constant rotary motion into intermittent rotary motion. The Geneva wheel 45 is operated by a cam shaft 44 that runs through holes 52 (not shown) in the left side 2 and right side 3 of the frame assembly 1 behind the drum 10. The cam shaft 44 is equipped with a cam 53 on the right end to engage the Geneva wheel 45 and a cam 53 on the left end to engage a drive belt 54 connected to the eccentric cam 55. Tension on the drive belt 54 may optionally be enhanced using tension wheels 56.

Figure 5:
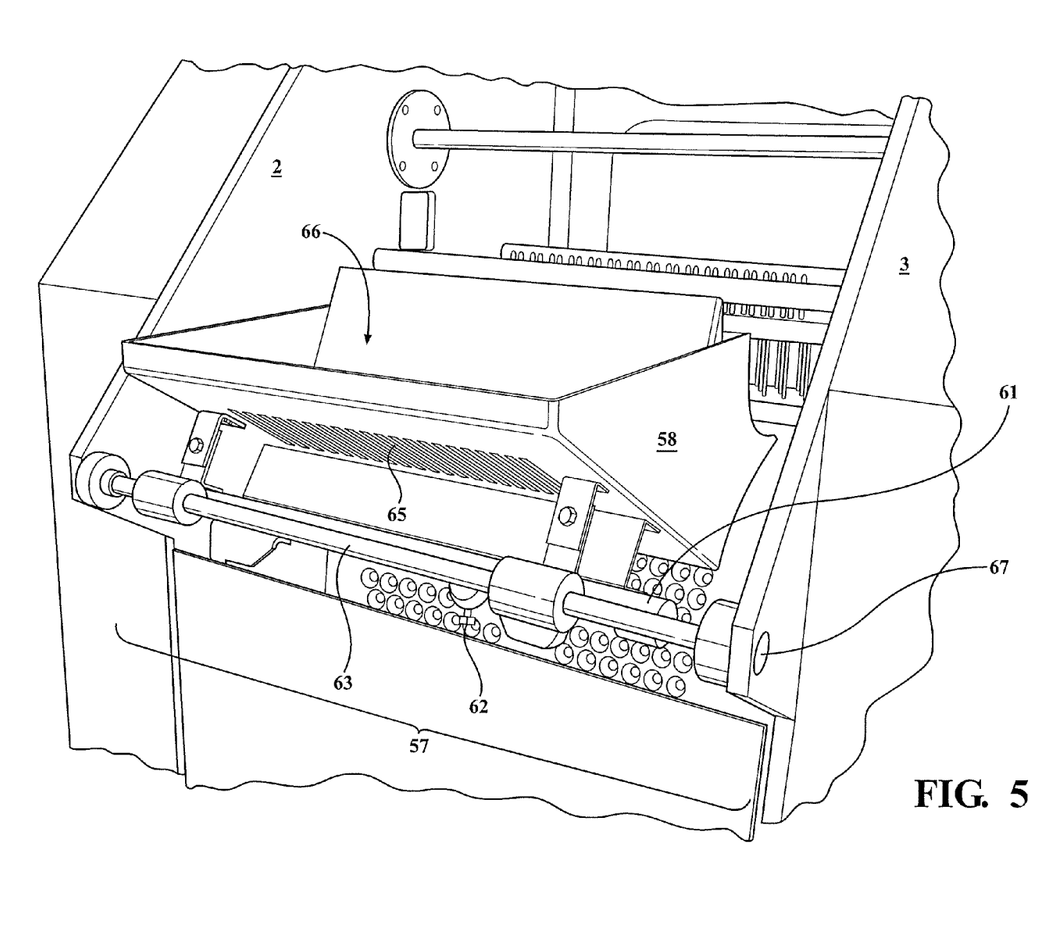
FIG. 5 is a close up view of the hopper assembly.
Figure 6:
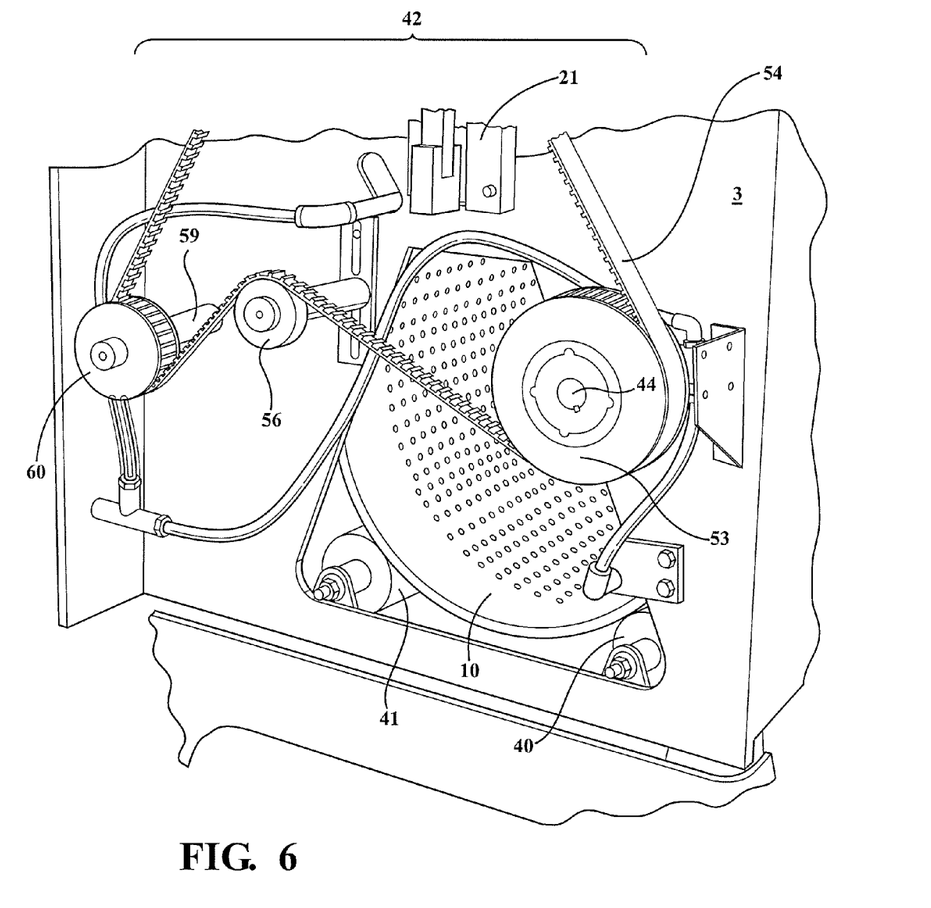
FIG. 6 is a close up view of the lower portion of the drive assembly.
Figure 11:
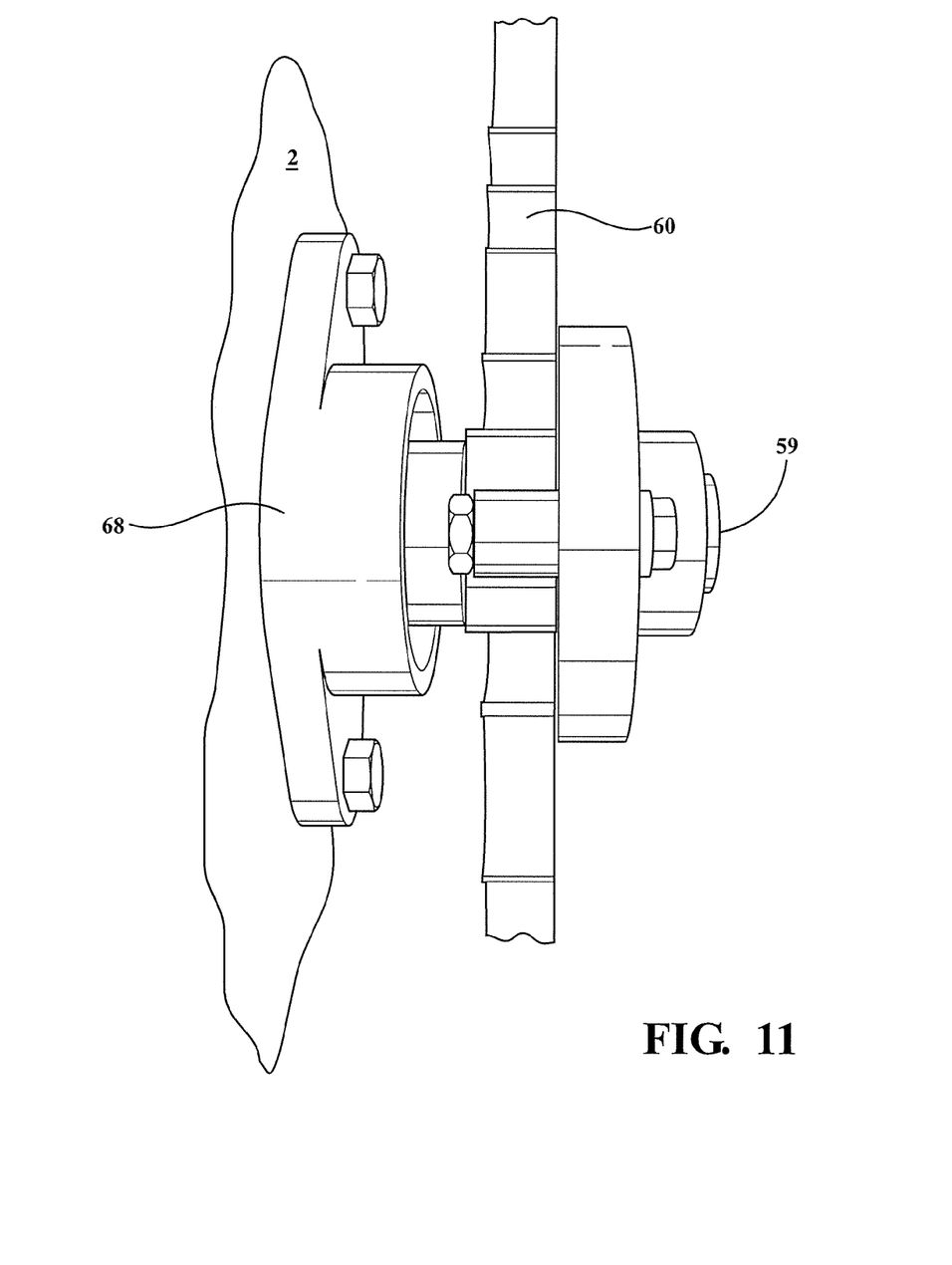
FIG. 11 is a front view of the hopper shaft and support bearing.

FIG. 5 is a close up view of the hopper assembly. As shown in FIG. 5 and FIG. 6, the hopper assembly 57 comprises a hopper 58, hopper shaft 59, hopper cam 60, roller 61, spring 62, and optionally a guide shaft 63. As shown in FIG. 3, optionally, the hopper assembly 57 may also include a hopper gate 64 to regulate the flow of fruit to the drum 10. The hopper 58 is the component configured to accept a load of fruit and guide it to the drum 10. The hopper 58 is also designed to oscillate from left to right to encourage the flow of fruit to the drum 10. In the preferred embodiment, the hopper 58 is located in the front 12 of the frame assembly 1 slightly above the front of the drum 10. It may include slots 65 that allow debris such as leaves or stems to fall out of the hopper 58 as it oscillates facilitating a purer flow of fruit to the drum 10. The hopper gate 64 may be placed into the interior portion 66 of the hopper 58 to restrict the flow of fruit to the drum 10 and reduce the risk of fruit not settling into one of the pockets 23 on the drum 10. Oscillation of the hopper 58 is accomplished using the hopper shaft 59. The left end of the hopper shaft 59 is attached to a hopper cam 60. The hopper cam 60 is attached to the drive belt 54 outside the left side of the frame assembly 1. The hopper shaft 59 is positioned so that it runs through a hole 67 in the right side 3 of the frame assembly 1 and runs underneath the hopper 58. The left end of the hopper shaft 60 is attached to a support bearing 68 affixed to the left side 2 of the support frame 1. FIG. 11 is a front view of the hopper shaft 59 and support bearing 68. The hopper shaft 59 is configured with a spring 62 that extends as the hopper 58 moves to the left side 2 of the frame assembly 1 and contracts as the hopper 58 moves to the right side 3 of the frame assembly 1. The hopper shaft 59 is configured with a roller 61 that pushes the hopper 58 to the left side 2 of the frame assembly 1 during one portion of its rotation extending the spring 62 and then releases the pressure in another portion of its rotation releasing the tension on the spring 62 and oscillates the hopper 58. Optionally, a guide shaft 63 may be added to maintain the orientation of the hopper 58 during oscillation. However, other methods of actuating the hopper 58 are possible.

The invention claimed is:
1. A fruit piercer comprising:
a frame assembly;
a needle assembly containing at least one needle;
a drum assembly fixed in position within the frame assembly comprising:
  a drum configured with a plurality of pockets fixed in position within the frame assembly;
  a support bearing;
  a hub;
  a drive shaft that connects to a the Geneva wheel on the exterior of the frame assembly; and
  a plurality of trunnion wheels
a drive assembly comprising:
  a source of rotary power;
  an eccentric assembly;
  a cam shaft;
  a gib located on the exterior of the frame assembly;
  a Geneva wheel located on the exterior of the frame assembly; and
a hopper assembly comprising:
  a hopper;
  a hopper shaft;
  a hopper cam;
  a roller; and
  a spring.

2. The fruit piercer of claim 1, wherein the hopper assembly further comprises a guide shaft.

3. The fruit piercer of claim 1, wherein the hopper assembly further comprises slots in the hopper for the passage of debris.

4. The fruit piercer of claim 1, wherein the hopper cam is located on the exterior of the frame assembly.

5. The fruit piercer of claim 4, wherein the hopper cam is connected to a source of rotary power comprising:
  a motor; and
  a drive belt.

6. The fruit piercer of claim 2, wherein the hopper assembly further comprises a hopper gate in the interior portion of the hopper.

* * * * *